United States Patent [19]

Shindo

[11] Patent Number: 5,485,404
[45] Date of Patent: Jan. 16, 1996

[54] EYE DIRECTION DETECTING METHOD AND APPARATUS INCLUDING METHOD AND APPARATUS FOR DETECTING BOUNDARY OF THE IRIS

[75] Inventor: Osamu Shindo, Tokyo, Japan

[73] Assignee: Asahi Kogaku Kogyo Kabushiki Kaisha, Tokyo, Japan

[21] Appl. No.: 623,570

[22] Filed: Dec. 7, 1990

[30] Foreign Application Priority Data

Dec. 7, 1989 [JP] Japan .................................. 1-316467

[51] Int. Cl.$^6$ .................................................. G06F 17/00
[52] U.S. Cl. ............................................. 364/559; 364/525
[58] Field of Search ................................. 354/400, 402, 354/406; 351/207, 209, 210; 364/413.01, 413.02, 188, 559, 525

[56] References Cited

U.S. PATENT DOCUMENTS

| Re. 31,370 | 9/1983 | Mashimo et al. ................. 354/402 |
|---|---|---|
| 3,864,030 | 2/1975 | Cornsweet . |
| 4,047,187 | 9/1977 | Mashimo et al. ................. 354/402 |
| 4,183,642 | 1/1980 | Fukuoka .......................... 354/402 |
| 4,574,314 | 3/1986 | Weinblatt ...................... 354/400 X |
| 4,636,624 | 1/1987 | Ishida et al. .................. 354/406 X |
| 4,648,052 | 3/1987 | Friedman et al. ........... 364/413.01 X |
| 4,786,934 | 11/1988 | Kunze et al. ................. 354/400 X |
| 4,836,670 | 6/1989 | Hutchinson ...................... 351/210 |
| 4,848,340 | 7/1989 | Bille et al. .................. 351/210 X |
| 5,002,384 | 3/1991 | Trachtman .................... 351/210 X |
| 5,036,347 | 7/1991 | Tsunekawa et al. ................ 354/400 |

FOREIGN PATENT DOCUMENTS

| 0055338 | 7/1982 | European Pat. Off. .......... G06F 3/00 |
|---|---|---|
| 2382056 | 9/1978 | France ........................ G06F 15/42 |
| 3331264 | 3/1984 | Germany . |
| 3841575 | 7/1989 | Germany . |
| 60-032012 | 2/1985 | Japan . |
| 60-041013 | 3/1985 | Japan . |
| 61-172552 | 8/1986 | Japan ............................ A61B 19/00 |
| 62-047612 | 3/1987 | Japan . |
| 62-189415 | 8/1987 | Japan . |
| 1277533 | 8/1989 | Japan . |
| 1241511 | 9/1989 | Japan . |
| 1412707 | 11/1975 | United Kingdom . |
| WO87/01571 | 3/1987 | WIPO . |

OTHER PUBLICATIONS

"Psychological Physic of Vision" by Mitsuo Ikeda, 1975.
"Fixation Point Measurement By the Oculometer Technique" by John Merchant, Optical Engineering, Jul./Aug. 1974, pp. 339–342.
"Methods and Design—Survey of Eye Movement Recording Methods", by Young and Sheena, Behavior Research Methods and Instrumentation, pp. 397–429 (vol. 7(5), 1975).

*Primary Examiner*—Ellis B. Ramirez
*Attorney, Agent, or Firm*—Sandler, Greenblum, & Bernstein

[57] ABSTRACT

An eye direction detecting method in which eye direction detecting light flux reflected by an eye impinges on a line sensor comprised of a photoconductive bit element array, so that the line sensor generates output signals including a first signal level corresponding to light flux reflected by an iris and a second signal level corresponding to light flux reflected by an eyeground, whereby information on a point of change between the first signal level and the second signal level is used to detect the eye direction, including setting a threshold level between the first signal level and the second signal level, detecting a pair of bit elements which have outputs larger and smaller than the threshold level, determining a first line based on the outputs of the pair of bit elements, obtaining a zero-cross bit element which is located at an intersecting point of the first line with a zero level, determining a second line which has an inclination angle smaller than that of the first line, determining a third line which has an inclination angle larger than that of the first line, judging whether the inclination angle of the second line is identical to that of the third line, and determining the point of change by the intersecting point of the second line and the third line when the inclination angles of the second and third lines are not identical to each other and by the intersecting point of the first line and the second line when the inclination angles of the second and third lines are identical to each other, respectively.

20 Claims, 10 Drawing Sheets

5,485,404

EYE DIRECTION DETECTING METHOD AND APPARATUS INCLUDING METHOD AND APPARATUS FOR DETECTING BOUNDARY OF THE IRIS

CROSS-REFERENCE TO RELATED APPLICATIONS

The present invention is related to the following commonly assigned application: Ser. No. 07/575,636, filed on Aug. 31, 1990; Ser. No. 07/982,427, filed on Nov. 27, 1992; Ser. No. 07/606,928, filed on Oct. 31, 1990; Ser. No. 07/618,965, filed on Nov. 28, 1990; Ser. No. 07/619,975, filed on Nov. 30, 1990; and Ser. No. 07/623,566, filed on Dec. 7, 1990.

BACKGROUND OF THE INVENTION

1. Field of the Invention

The present invention relates to an eye direction detecting method for detecting the human eye direction.

This application is related to the commonly assigned application Ser. No. 07/576,191, (U.S. Pat. No. 5,327,191) the disclosure of which are expressly incorporated in its entirety by reference herein.

2. Description of Related Art

Application Ser. No. 07/576,191 (U.S. Pat. No. 5,327, 191) discloses an eye direction detecting apparatus which has a line sensor including a photoconductive bit element array on which collimated eye direction detecting light flux which is incident upon an eye ball and is reflected thereby impinges to detect the eye direction in accordance with the output signal of the line sensor. The light flux reflected by the eye ball includes a peak signal (e.g., first Purkinje image) which varies the peak position thereof in accordance with the eye direction and also includes a signal (first signal level) corresponding to the light flux reflected by the iris and a signal (second signal level) corresponding to light flux reflected by an eyeground (also referred to as a retina portion of the eye). The point of change between the first signal level and the second signal level gives information on a position of the inner edge of the iris, and accordingly, the edge of the pupil. Accordingly, the eye direction can be detected in accordance with information of the position of the pupil edge and information of the position of the peak signal.

In this eye direction detecting method, the position of the peak signal can be relatively easily and precisely detected, but it is very difficult to precisely detect the point of change (e.g., boundary) between the first signal level and the second signal level due to noise contained therein. The inaccurate detection of the edge of the pupil results in an imprecise detection of the eye direction.

SUMMARY OF THE INVENTION

The primary object of the present invention is to provide an eye direction detecting method which can precisely detect a point of change between the portion of a photoconductive signal of light flux reflected by the eye ball that corresponds to the light flux reflected from the iris and the portion of the photoconductive signal that corresponds to the light flux reflected from the eyeground even if the photoconductive signal includes a noise.

The eye direction detecting method of the present invention is characterized in that the detecting of the point of change includes two steps of a first determination step, in which the point of change is provisionally determined, and a second determination step in which the point of change is more precisely detected in accordance with data on position of the provisionally determined point of change. If no output signal is sent from a line sensor in the second determination step, the position data of the provisionally determined point of change is effectively used to detect the change of point thereby, to detect the eye direction.

To achieve the object mentioned above, according to one aspect of the present invention, there is provided an eye direction detecting method in which eye direction detecting light flux reflected by an eye impinges on a line sensor comprised of a photoconductive bit element array, so that the line sensor generates output signals including a first signal level corresponding to light flux reflected by an iris and a second signal level corresponding to light flux reflected by an eyeground, whereby information on a point of change between the first signal level and the second signal level is used to detect the eye direction, comprising, steps of setting a threshold level between the first signal level and the second signal level, detecting a pair of bit elements which have outputs larger and smaller than the threshold level, respectively, determining a first line based on the outputs of the pair of bit elements or a pair of bit elements which have a specific relationship to said pair of bit elements, obtaining a zero-cross bit element which is located at an intersecting point of the first line with a predetermined output level, determining a second line which has an inclination angle in absolute value smaller than that of the first line, based on the outputs of the zero-cross bit element and a bit element having a specific relationship to the zero cross bit element or the outputs of a pair of bit elements having a specific relationship to the zero-cross bit element, determining a third line which has an inclination angle in absolute value larger than that of the first line with reference to the zero-cross bit element, judging whether the inclination angle of the second line is substantially identical to that of the third line, and determining the point of change by the intersecting point of the second line and the third line when the inclination angles of the second and third lines are not substantially identical to each other and by the intersecting point of the first line and the second line when the inclination angles of the second and third lines are substantially identical to each other, respectively.

BRIEF DESCRIPTION OF THE DRAWINGS

The present invention will be described below in detail with reference to the accompanying drawings, in which.

DESCRIPTION OF THE PREFERRED EMBODIMENTS

The following discussion will be directed to an embodiment applied to an auto focusing optical system of a single lens reflex camera.

Figure 2:
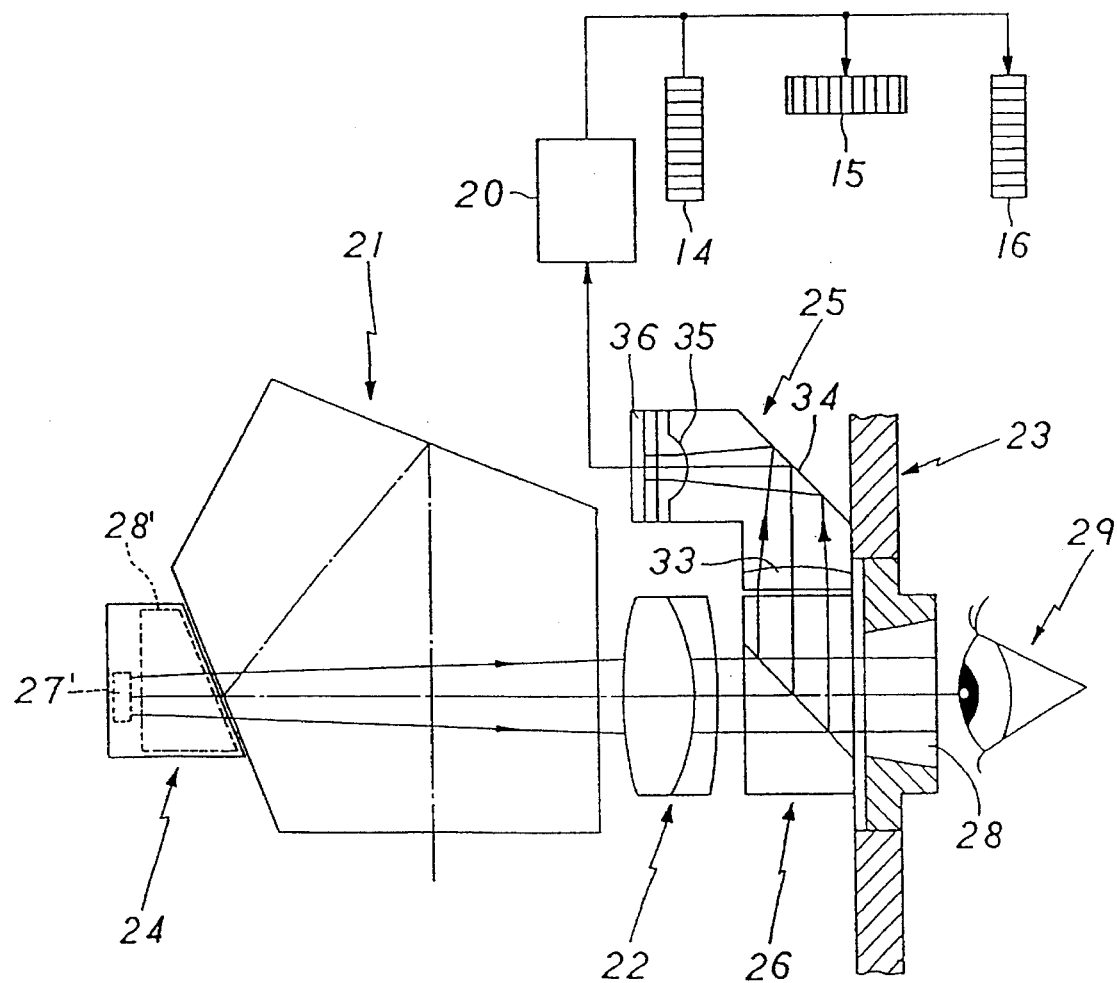
FIG. 2 is a schematic view of a main part of an optical system in an eye direction detecting apparatus according to the present invention.
Figure 3:
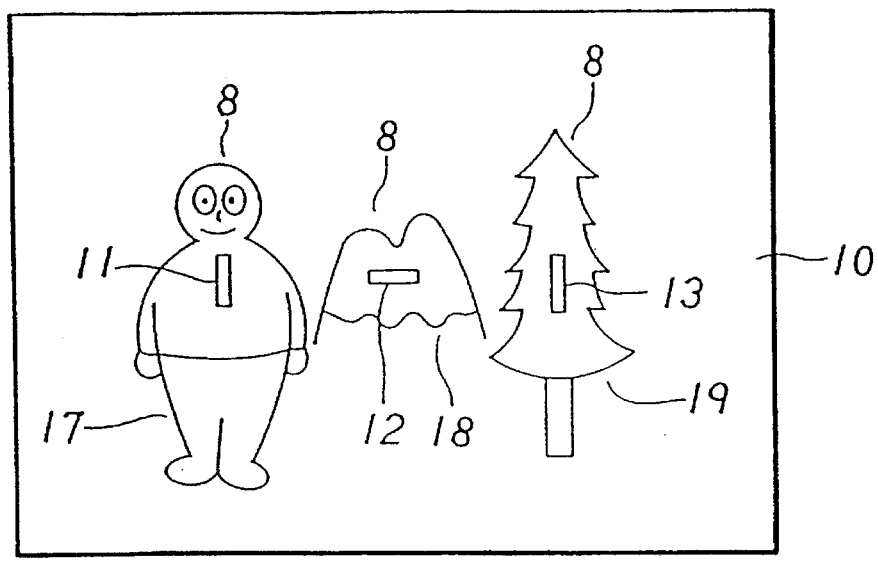
FIG. 3 is a schematic view of a finder field of view in a single lens reflex camera which has therein an eye direction detecting apparatus according to the present invention.

In FIG. 3 which shows a finder field of view of a single lens reflex camera, there are three focusing zones 11, 12 and 13 in the finder field of view. The distance between the centers of the focusing zones 11, 12 and 13 is about 9 mm in the illustrated embodiment. A single lens reflex camera has auto focusing optical systems (not shown) corresponding to the focusing zones 11, 12 and 13. The auto focusing optical systems have focusing zones (not shown) corresponding to the zones 11, 12 and 13 at positions conjugate with the focusing zones 11, 12 and 13. The auto focusing optical systems corresponding to the focusing zones 11, 12 and 13 have CCD's 14, 15 and 16, as shown in FIG. 2. Images of subjects 17, 18 and 19 to be taken are formed on the CCD's 14, 15 and 16 by a pair of separator lenses (not shown) which constitute a part of the auto focusing optical systems.

The CCD's 14, 15 and 16 are selectively driven in accordance with an output signal of a processing circuit 20 of an eye direction detecting apparatus which will be described hereinafter.

The following discussion will be addressed to a general construction of an optical system of the eye direction detecting apparatus (FIG. 2).

In FIG. 2, numeral 21 designates a pentagonal prism, 22 an eyepiece lens, 23 a camera frame, 24 a eye direction detecting light transmission system of the eye direction detecting apparatus, 25 a light receiving system of the eye direction detecting apparatus, and 26 a beam splitter. The light transmission system 24 has a light source 27' and a compensator prism 28'. The light source 27' emits infrared eye direction detecting light which is transmitted through the compensator prism 28' and pentagonal prism 21 to impinge upon the eyepiece lens 22, so that the infrared light is collimated thereby. The collimated infrared light flux is introduced to a finder window 28 through the beam splitter 26. When a photographer looks at the finder window 28 with his or her eye 29, the photographer can observe the subjects 17, 18 and 19, as shown in FIG. 3. At the same time, the collimated infrared light flux for detecting the eye direction is projected to the photographer's eye.

Figure 4:
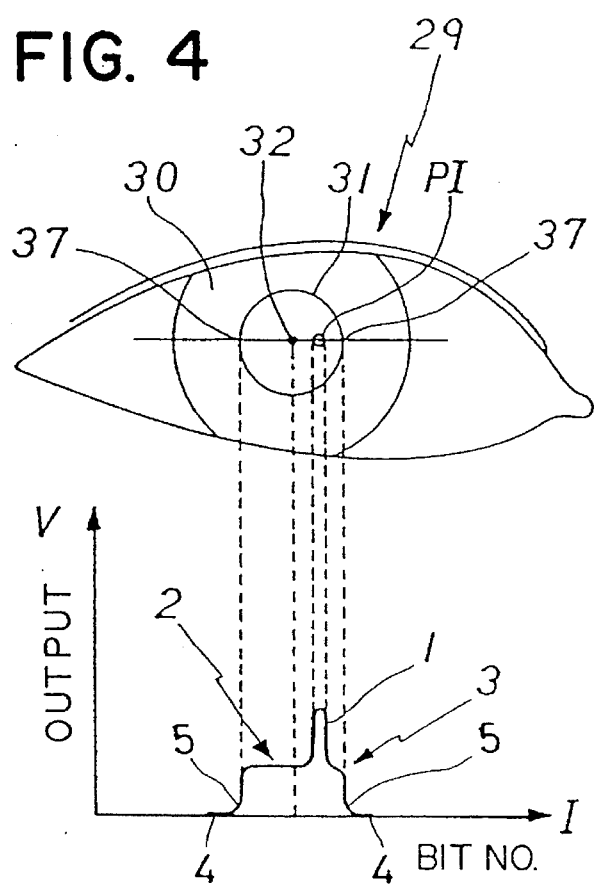
FIG 4 is an explanatory view of a first Purkinje image which is formed on an eye, using an eye direction detecting apparatus of the present invention.

By the projection of the collimated infrared light flux, a first Purkinje image PI is formed on a cornea 30 of the eye 29 as shown in FIG. 4. A part of infrared light flux reaches the eyeground through the cornea 30. It is known that the position of the first Purkinje image PI varies as the eye ball rotates to change the eye direction. Accordingly, the rotating angle of the eye ball can be obtained by the positional relationship between the first Purkinje image PI and the center 32 (or the edge) of the pupil 31. This is disclosed in detail for example in application Ser. No. 07/576,191 U.S. Pat. No. 5,327,191).

Figure 6:
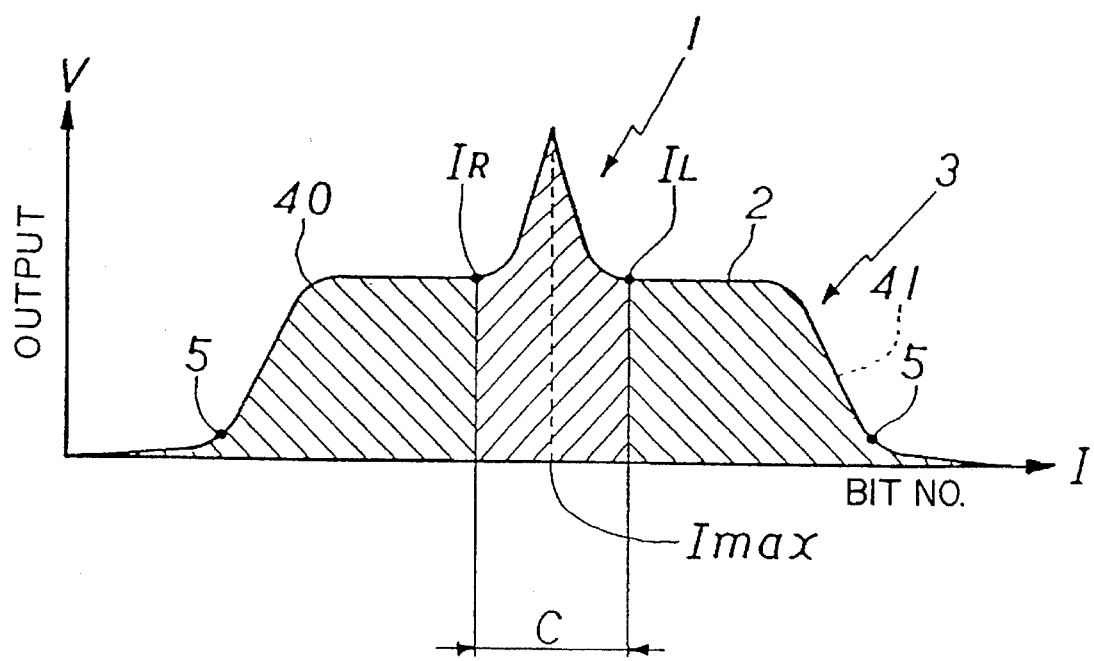
FIG. 6 is a diagram showing the process for removing a peak component from a photoelectric signal distribution curve.
Figure 7:
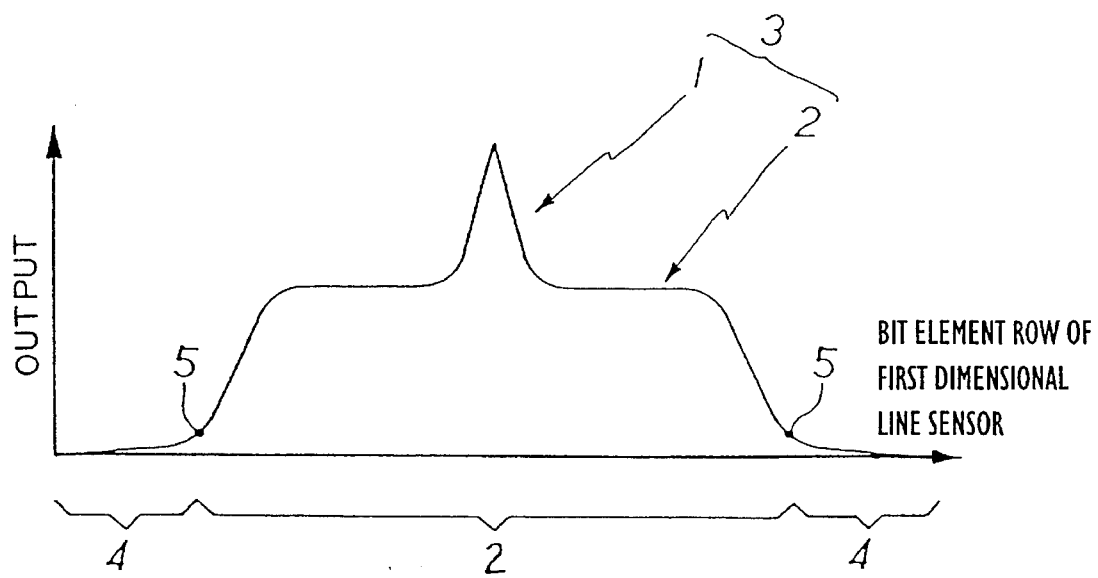
FIG. 7 is a diagram showing a model of photoelectric signal distribution curve.

The light flux reflected from the eyeground and the light flux from the cornea 30 are made again incident upon the beam splitter 26 through the finder window 28. As a result, the fluxes are reflected by the beam splitter 26 toward the light receiving system 25. The light receiving system 25 includes a condenser lens 33, a mirror 34, an image forming lens 35 and first dimensional line sensor (CCD) 36 which has a large number of photoconductive bit elements having a predetermined width. Image of the reflection light flux reflected by the eyeground and the the first Purkinje image PI based on the reflection light flux reflected by the cornea 30 are formed in the first dimensional line sensor 36. The first dimensional line sensor 36 outputs a photoelectric signal corresponding to the images. The photoelectric signal distribution curve 3 contains a peak component 1 corresponding to the first Purkinje image PI, a signal component 2 corresponding to the light flux reflected from the eyeground, and a signal component 4 corresponding to the reflection light flux from the iris, as shown in FIGS. 6 and 7. The photoelectric signal which defines the photoelectric distribution curve 3 is inputted to the processing circuit 20.

FIGS. 6 and 7 show an ideal model of the photoelectric signal distribution curve 3. Supposing that the portion 4 corresponding to the reflection light flux from the iris is the first signal level and the portion 2 corresponding to the reflection light flux from the eyeground is the second signal level, there is a clear difference between the two portions 4 and 2, due to a difference in reflectivity. The boundaries (points of change) 5, 5 between the two signal levels define two diametrically opposed points 37, 37 of the pupil. The eye direction is determined in accordance with the relative positional relationship between the peak component 1 by the first Purkinje image PI and the pupil (e.g., the center or the opposite points 37 thereof, etc). It is very important to exactly detect the points of change 5 in order to precisely detect the eye direction.

It appears that there is no difficulty in detecting the points of change 5 in FIGS. 6 and 7, in which the points 5 clearly appear therein. However, the photoelectric signal distribution curve 3 which is actually obtained has no clear points of change 5.

To detect the points of change 5 from the photoelectric signal 3 having no clear points of change due to noises, the signal processing circuit 20 performs the following operations in accordance with a predetermined arithmetic operation program.

Figure 9:
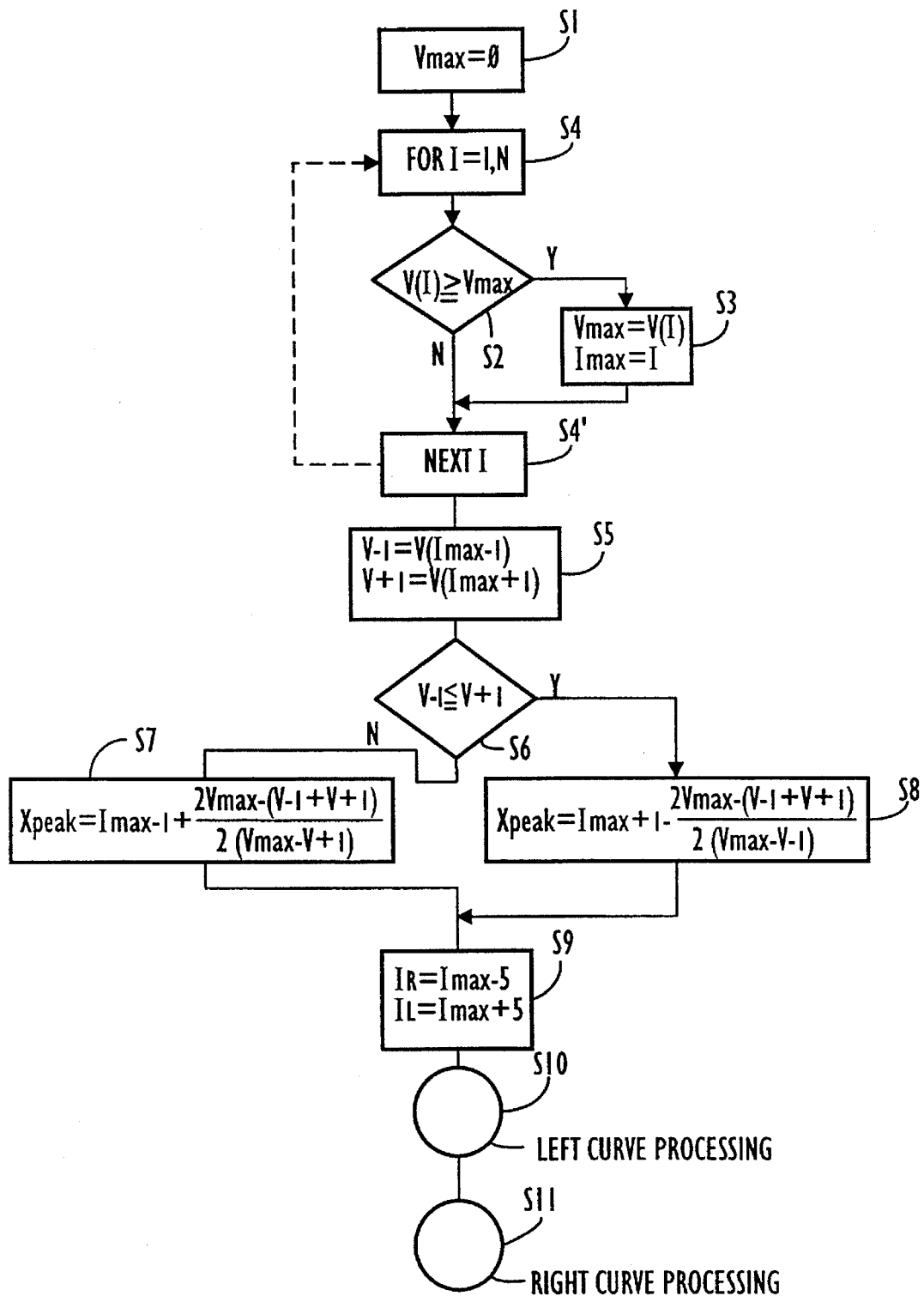

(1) To detect the position of the first Purkinje image PI:

(1)-① Step to detect a bit element corresponding to the peak value of the photoelectric signal distribution curve 3;

In this step, to obtain a maximum value by the conventional method, per se known, an initial value Vmax=0 (step S1 in FIG.9) is set in a maximum value storing memory (not shown) as a provisional maximum value Vmax. The bit elements of the first dimensional line sensor, the number of which is N, are successively retrieved from the left to right to find a bit element which outputs a value exceeding the provisional maximum value Vmax. The bit element thus detected is renewed as a bit element having a second provisional maximum value Vmax, so that the address Imax of the bit element corresponding to the second provisional maximum value Vmax is stored in a bit address storing memory (not shown).

In other words, the second provisional maximum value Vmax is compared with the output V (I) of the bit element No.I at step S2. If V(I)≧Vmax, Vmax=V(I) and Imax=I are set at step S3. Conversely, if V(I)<Vmax, the address No. of the bit element is increased by one at step S4, the operation at step S2 is repeated.

The above mentioned operations from steps S1 to S4 are repeated until I=N, namely, the above mentioned operations are performed for the final bit element (N-th bit element). Consequently, a real maximum value (peak value) Vmax is stored in the maximum value storing memory, and the address Imax of the corresponding bit element is stored in the bit address storing memory.

Figure 5:
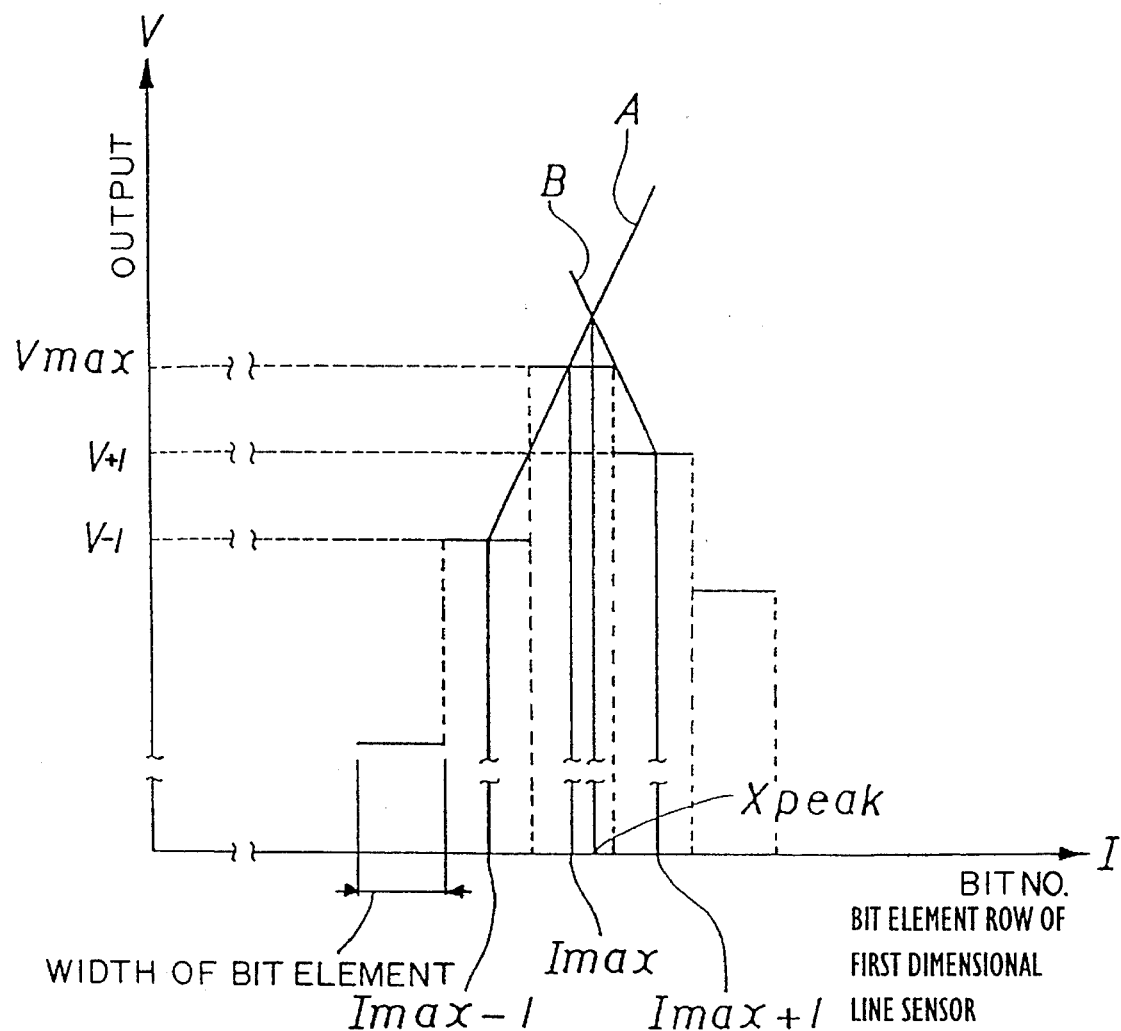
FIG. 5 is a view similar to FIG. 4, for explaining the process for obtaining a position of a peak value (peak position) of a wave shape of a signal in a signal processing circuit shown in FIG. 2, based on an interpolation method.

(1)-② Step to detect the position of the first Purkinje image PI as an interpolation coordinate Xpeak, using the bit element which outputs the maximum value(FIGS. 5 and 9):

In this step, No. Imax of the bit element and the real maximum value Vmax are read out from the bit address storing memory and the maximum value storing memory, respectively.

Thereafter, No. Imax−1 of the bit element next left to the No. Imax is read out from the bit address storing memory, so that the output Value V(Imax−1) of the No. Imax−1 bit element is stored as $V_{-1}$ in the maximum value storing memory. In addition, No. Imax+1 of the bit element next right to the No. Imax is read out from the bit address storing memory so that the output value V(Imax+1) of the No. Imax−1 bit element is stored as $V_{+1}$ in the maximum value storing memory (step S5).

After that $V_{-1} \leq V_{+1}$ is judged at step S6. Then, the control proceeds to step S7 or S8 to obtain the interpolation coordinate Xpeak.

If the output $V_{-1}$ of the No. Imax−1 bit element is equal to the output $V_{+1}$ of the No. Imax+1 bit element, it can be considered that the peak value is given at the central position of the No. Imax bit element. However, since the output $V_{-1}$ is not usually equal to the output $V_{+1}$, and since the bit element has a certain width, the value Xpeak is obtained by the interpolation method in the present invention.

Namely, if $V_{-1} \leq V_{+1}$ at step S6, an intersecting point of lines A and B (FIG. 5) is obtained by the following equation which mathematically gives an inclination of a line at step S8;

$$Xpeak = Imax+1-[\{2 \cdot Vmax-(V_{-1}+V_{+1})\}/2 \cdot (Vmax-V_{-1})]$$

If $V_{-1} > V_{+1}$ at step S6, the following equation is used instead thereof at step S7;

$$Xpeak = Imax-1+[\{2 \cdot Vmax-(V_{-1}+V_{+1})\}/2 \cdot (Vmax-V_{+1})]$$

Thus, the position of the first Purkinje image PI can be obtained as the interpolation coordinate Xpeak, based on the bit element which output the peak value and a pair of bit elements on the opposite sides of the bit element.

(2) To withdraw bit elements relating to the first Purkinje image PI from the subject to be operated:

In this process, the bit elements corresponding to the peak component 1 (FIG. 6) are withdrawn from the operation. This can be achieved by not reading the outputs of the bit elements on the right and left sides of the No. Imax bit element. In FIG. 6, the bit elements included in an area designated at C is withdrawn from the subject to be operated.

The number of bit elements which are to be withdrawn depends on the optical property of the eye direction detecting apparatus and the widths of the bit elements of the first dimensional line sensor 36. Preferably, it is determined, while looking at the wave shape of the photoelectric signal distribution curve 3 which can be displayed on a cathode-ray tube display.

In the illustrated embodiment, the bit elements between the 4th bit elements (Imax−4) and (Imax+4) counted from the bit element Imax which outputs the real maximum value Vmax in the opposite directions thereof are withdrawn.

Thereafter, to determine threshold levels of the bit elements on the right and left sides of the withdrawn bit elements, upon detecting the diametrically opposed points 37 of the pupil (iris) which will be discussed below, right end bit element $I_R$ of the curve 40 on the left side and left end bit element $I_L$ of the curve 41 on the right side are obtained, as follows. Namely, the bit element No. Imax−5 is stored in the portion of the memory corresponding to the right end bit element $I_R$. After that, the bit element No. Imax+5 is stored in the portion of the memory corresponding to the left end bit element $I_L$ (step S9).

(3) To detect the diametrically opposed points 37 of the pupil (iris):

The outputs of the bit elements with removed bit elements outputting the peak component 1 are used to detect the points of change 5 for the left and right curves 40 and 41. Since the operation for the right curve 41 is symmetrical to that for the left curve 40 with respect to the peak component 1, the following discussion will be directed only to the operation for the left curve 40.

Figure 1:
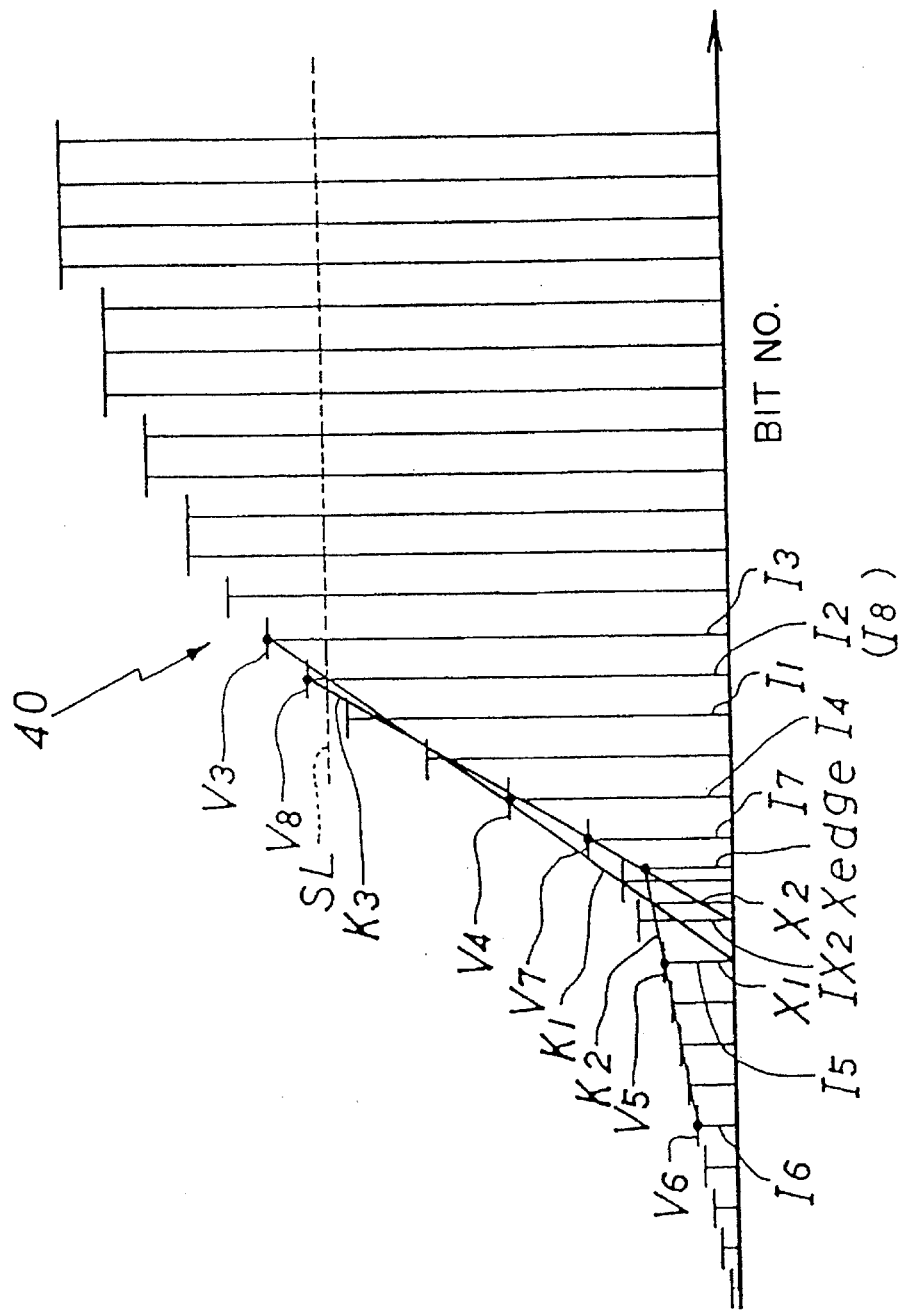
FIG. 1 is a schematic diagram of an embodiment of an eye direct ion detecting method according to the present invention.
Figure 10:
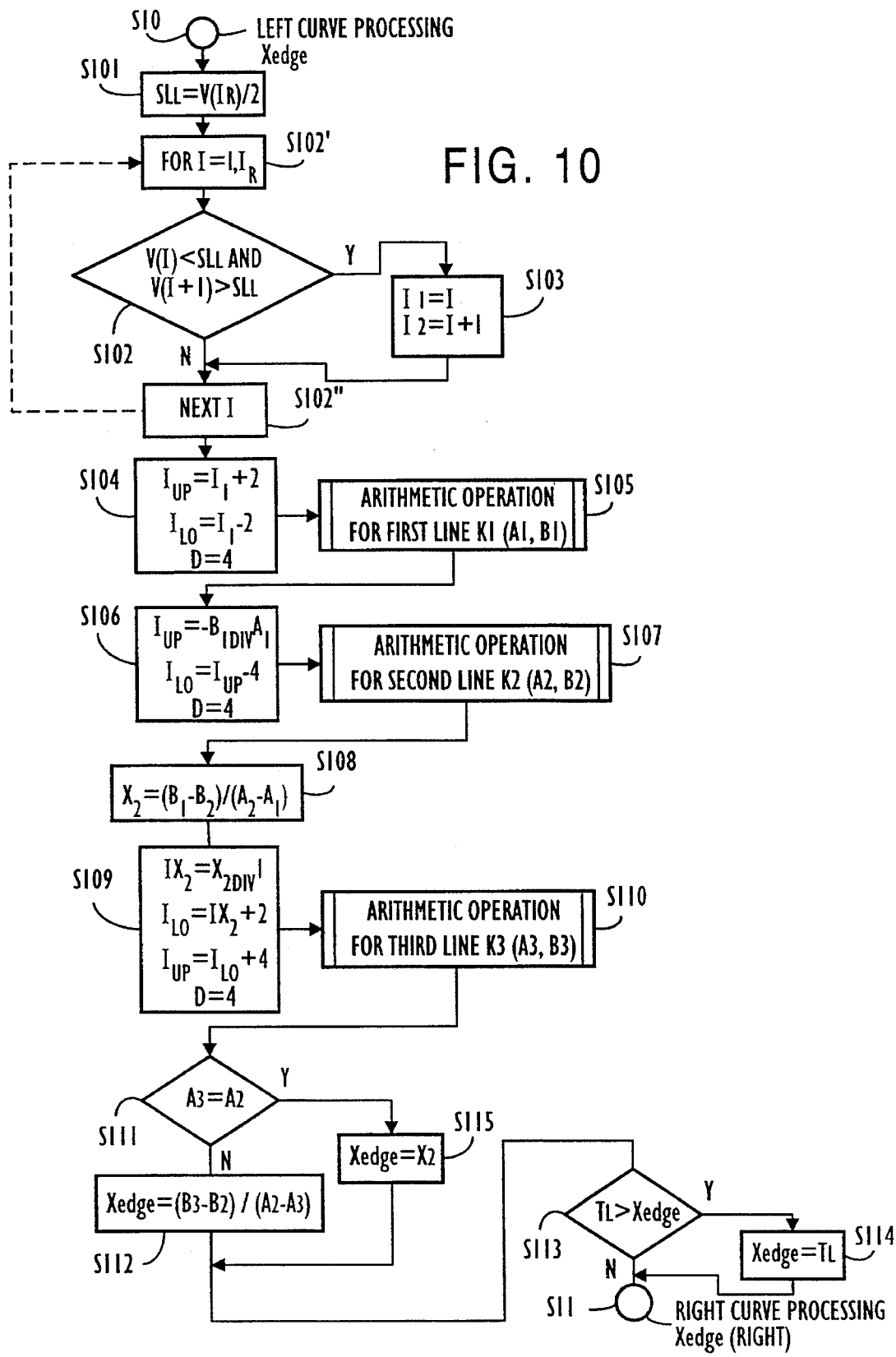

(3)-① A threshold level SL which is below the output value $V(I_R)$ of the right end bit element $I_R$ (IR=Imax−5) of the right curve 40 is set as shown in FIG. 1. Preferably, the threshold level SL is approximately half the output value $V(I_R)$ of the bit element $I_R$. Namely, in the illustrated embodiment, $SL_L = V(I_R)/2$ (step S101 in FIG. 10).

Whether or not the outputs V(I) and $V(I_{+1})$ of two adjacent bit elements are below and above the threshold level $SL_L$, respectively, is checked at step S102. This is repeated from I=1 until I=$I_R$ (step S102'). When the two adjacent bit elements which satisfy the above condition are found, they are stored in the memory as $I_1$ and $I_2$ (FIG. 1), respectively (step S103).

(3)-② A first line K1 is obtained to detect the point of change 5 using the Newton method.

First, the second bit element $I_1$+2 (=I3) from the bit element $I_1$ in the right direction and the second bit element $I_1$−2(=I4) from the bit element $I_1$ in the left direction are obtained and stored in the portions $I_{UP}$ and $I_{LO}$ of the memory (step S104). Also, D=4 is stored in the memory. "D" means the bit numbers between $I_3$ and $I_4$. Thereafter, the control proceeds to step S105 to perform the arithmetic operation for determining the first line K1. Namely, the first line K1 is obtained by connecting the output values $V_3$ and $V_4$ corresponding to $I_3$ and $I_4$, respectively. It can be considered that the outputs of the bit elements including and adjacent to the bit elements $I_1$ and $I_2$ are located along the first line K1 or the vicinity thereof. The line K1 has an inclination angle $A_1$ and an intercept (an output at reference bit) $B_1$ given by the following equations, respectively.

$$A = \{V(I_{UP}) - V(I_{LO})\}/D$$

$$B = \{I_{UP} \times V(I_{LO}) - I_{LO} \times V(I_{UP})\}/D$$

(3)-③ An intercepting point $X_1$ at which the first line K1 intersects the zero level (predetermined level) is obtained. Thereafter, a bit element which is closest to the point $X_1$ on the left side is set as a zero-cross bit element ($I_5$). This can be obtained by memorizing the value ($-B_1$ DIV $A_1$) at the memory portion $I_{UP}$. ($B_1$ DIV $A_1$) is given by the following equation.

$$B_1 \text{ DIV } A_1 = SGN(B/A) \cdot INT(ABS(B/A))$$

wherein ABS(B/A) means an absolute value of B/A, INT means an integral number of B/A which is rounded to a nearest smaller integer, and SGN means a sign for judging negative and positive of the value of B/A, respectively.

Thus, the zero-cross bit element is obtained.

Thereafter, the 4th bit element $I_{UP}$–4 (=$I_6$) counted from the zero-cross bit element $I_5$ in the left direction is memorized in the memory portion $I_{LO}$ (step S106). After that, the control proceeds to step S107 in FIG. 10 to perform the routine of the arithmetic operation for obtaining the second line K2 in FIG. 12. The second line K2 is obtained by connecting the output, value $V_6$ of the bit element $I_6$ and the output value $V_5$ of the zero-cross bit element $I_5$. It can be considered that the outputs of the bit elements including and adjacent to the bit elements $I_5$ and $I_6$ are located along the second line K2 or the vicinity thereof. The second line K2 has an inclination angle $A_2$ smaller than that of the first line K1. The inclination angle $A_2$ and an intercept $B_2$ can be obtained in a similar way to the first line K1.

(3)-④ An intersecting point $X_2$ of the first line K1 and the second line K2 is mathematically given by the following formula at step S108.

$$X_2=(B_1-B_2)/(A_2-A_1)$$

The intersecting point $X_2$ thus obtained is a provisional point of change 5 of the photoelectric signal distribution curve 3.

To detect the point of change 5 with a higher precision, a third line K3 is detected using the intersecting point $X_2$ in the present invention, as mentioned below. Namely, a third line K3 which has an inclination angle (absolute value) larger than that of the first line K1 is obtained, based on the bit elements in the vicinity of the intersecting point $X_2$, as will become apparent from the explanation in the following ⑤. The change of point 5 is given by an intersecting point of the second line K2 and the third line K3.

(3)-⑤ A bit element $I_{x2}$ which is closest left to the intersecting point $X_2$ is obtained by the following equation.

$$I_{x2}=X_2 \text{ DIV } 1$$

Figure 12:
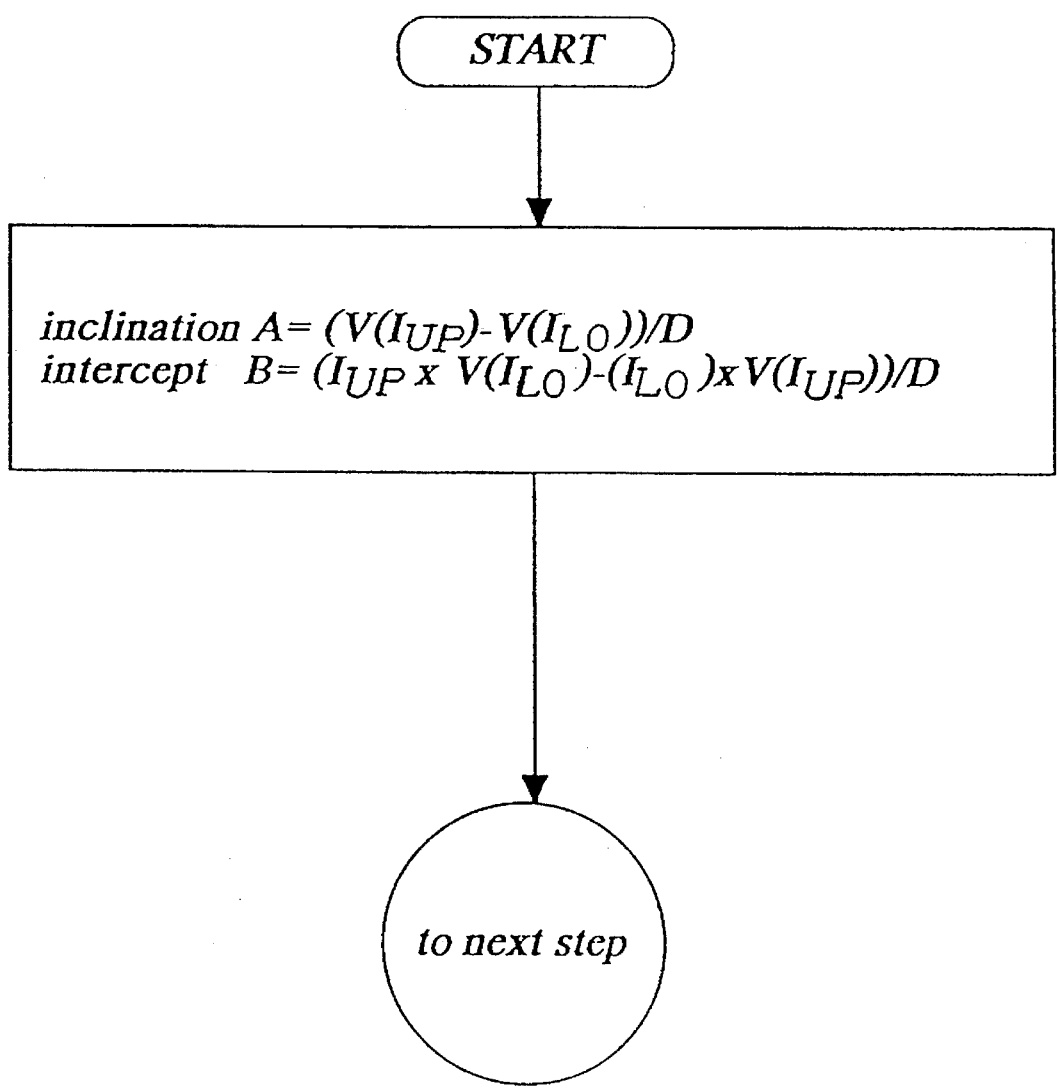

As a result, the third line K3 is obtained by connecting the output value $V_7$ of the second bit element $I_7$ counted from the bit element $I_{x2}$ in the right direction and the output value $V_8$ of the 4th bit element $I_8$ (which is identical to the $I_2$ in this embodiment) counted from the bit element $I_7$. Namely, the value ($X_2$+2) is stored in memory portion $I_{LO}$ and the value ($I_{LO}$+4) is stored in the memory portion $I_{UP}$ to designate the bit element to be used (step S109). After that, the control proceeds to step S110 to perform the operation for obtaining the third line K3, as shown in FIG. 12, to the inclination angle $A_3$ and an intercept $B_3$. It can be considered that the outputs of the bit elements including and adjacent to the bit elements $I_2$ and $I_7$ are located along the second line K3 or the vicinity thereof. The line K3 represents the outputs of the bit elements along therewith with higher precision than the first line K1. The inclination angle $A_3$ and the intercept $B_3$ can be obtained in the similar way to the first line K1.

(3)-⑥ The intersecting point Xedge thus obtained corresponds to the point of change 5 which defines one of the diametrically opposed points 37 of the pupil.

The above mentioned operations are performed for the right curve 41 to obtain the other diametrically opposed point 37 of the pupil. The center of the pupil can be given by a mean value of the coordinates of the diametrically opposed points 37.

At step S111, whether the inclination angle $A_2$ of the second line K2 is identical to the inclination angle $A_3$ of the third line K3 is checked to judge whether the intersecting point Xedge can be obtained by the second line K2 and the third line K3.

If $A_3$ is not identical to $A_2$, the intersecting point Xedge is obtained by the following equation, using the second line K2 and the third line K3(step S112):

$$X\text{edge}=(B_3-B_2)/(A_2-A_3)$$

Figure 11:
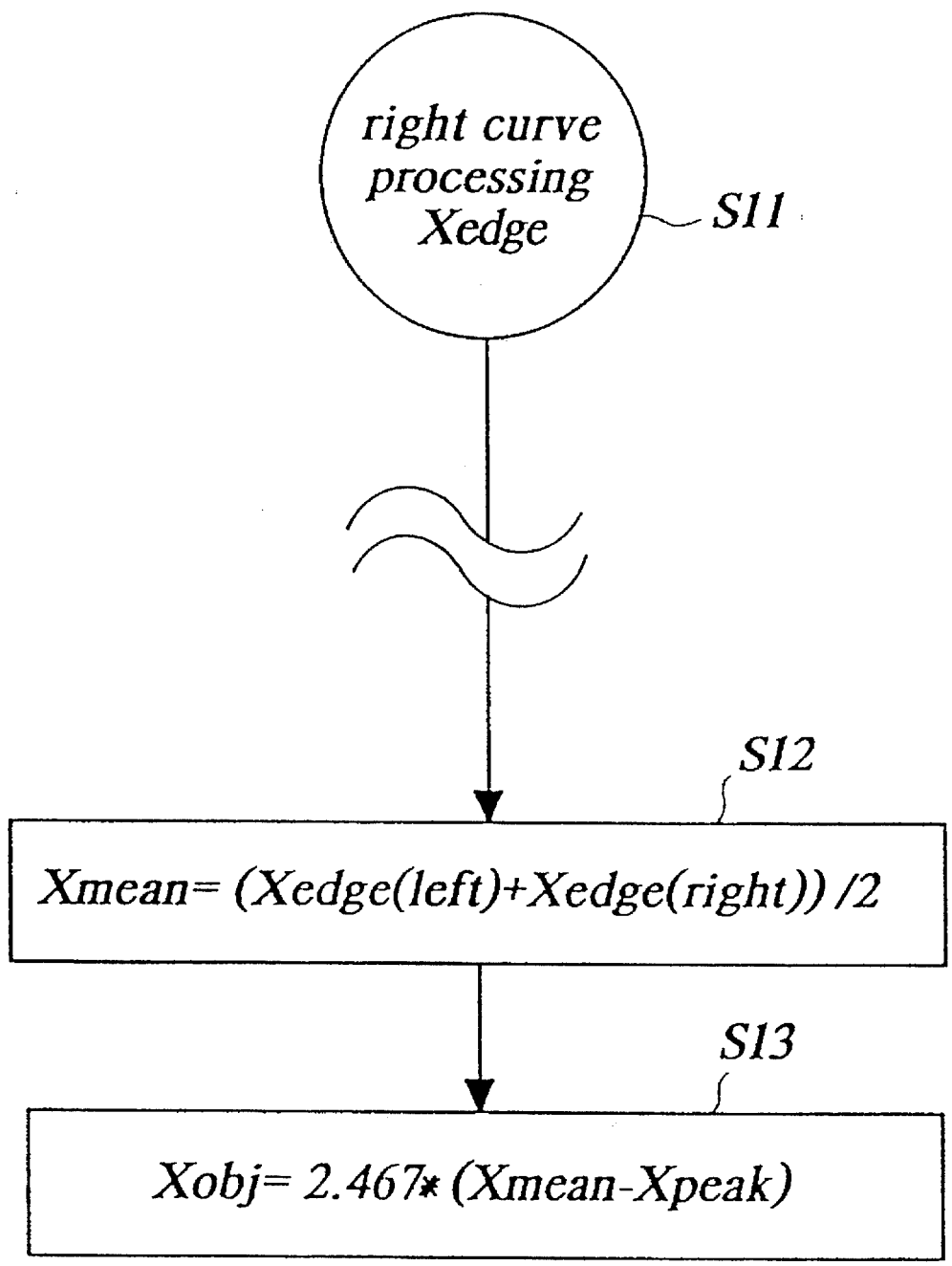

Thereafter, whether the value of Xedge is above a certain limit TL is checked at step S113. If the limit TL is above Xedge, the latter is set to be TL (Xedge=TL) to perform the operation for the right curve 41 (step S11). Conversely, if the limit TL is equal to or smaller than Xedge, the control is directly transferred to the operation for the right curve (step S11 in FIG. 11). A similar operations are performed for the right curve.

When the operation for the right curve is completed, a mean value Xmean of the intersecting points of Xedge (left and right sides) is obtained to detect the center of the pupil (step S12). Thereafter, the position Xobj of the X coordinate is obtained by the following arithmetic formula, using the mean value Xmean and the interpolation coordinate Xpeak to detect the eye direction (step S13):

$$X\text{obj}=C\cdot(X\text{mean}-X\text{peak})$$

The coefficient C of the formula is a value obtained by the principle of the detection of the eye direction. As described in application Ser. No. 07/982,427, the coefficient C is 2.467.

(3)-⑦ If the intersecting point Xedge can not be obtained by the second line K2 and the third line K3, the intersecting point $X_2$ of the first line K1 and the second line K2 is provisionally deemed to be the point of change 5. Namely, at step S111 in FIG. 10, when the inclination angle $A_2$ of the second line K2 is identical to the inclination angle $A_3$ of the third line K3, control proceeds to step S115 to set Xedge identical to $X_2$ (Xedge=$X_2$). After that, the control proceeds to step S113.

Figure 8:
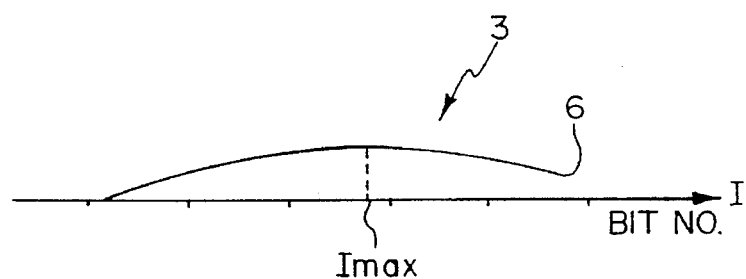
FIG. 8 is a diagram of an output of a photoelectric signal measured in the present invention; and, FIGS. 9, 10, 11 and 12 are flow charts of processes of an eye direction detecting method according to the present invention.

FIG. 8 shows an example of the photoelectric signal distribution curve 3 when the eyelid is closed. If the above mentioned operations at S115 are performed in the the photoelectric signal distribution curve 3 shown in FIG. 8, in accordance with the present invention, the center of the pupil is obtained, and the point of the center of pupil coincides to a bit element Imax which generates a true maximum output. As a result, the center focusing zone 12 is selected and the CCD 15 corresponding to the focusing zone 12 operates.

Although specific bit elements counted from a reference bit element are selected t9 determine the first, second and third lines K1, K1', K2, K2' and K3 in the above mentioned embodiments, the photoconductive bit elements of the line sensor to be selected depends on the size thereof, or the optical property of the photoconductive signals to be processed, etc.

I claim:

1. An eye direction detecting method in which eye direction detecting light flux reflected by an eye impinges on a line sensor comprised of a photoconductive bit element array, so that the line sensor generates output signals including a first signal level corresponding to light flux reflected by an iris and a second signal level corresponding to light reflected by a retina, whereby information on a point of change between the first signal level and the second signal level is used to detect the eye direction, said eye direction detecting method comprising the steps of;

setting a threshold level between the first signal level and the second signal level;

detecting a pair of bit elements which have outputs larger and smaller than the threshold level, respectively;

determining a first line based on the outputs of the pair of bit elements or a pair of bit elements which have a specific relationship to said pair of bit elements;

obtaining a zero-cross bit element which is located at an intersecting point of the first line with a predetermined output level;

determining a second line which has an inclination angle in absolute value smaller than that of the first line, based on the outputs of the zero-cross bit element and a bit element having a specific relationship to the zero-cross bit element or the outputs of a pair of bit elements having a specific relationship to the zero-cross bit element;

determining a third line which has an inclination angle in absolute value larger than that of the first line with reference to the zero-cross bit element;

judging whether the inclination angle of the second line is substantially identical to that of the third line; and, determining the point of change by the intersecting point of the second line and the third line when the inclination angles of the second and third lines are not substantially identical to each other and by the intersecting point of the first line and the second line when the inclination angles of the second and third lines are substantially identical to each other, respectively.

2. An eye direction method according to claim 1, wherein the eye direction is determined as a function of a relative positional relationship between the point of change and a peak value of the photoconductive signals defined by a first Purkinje image.

3. An eye direction detecting method according to claim 1, wherein the threshold level is approximately a median of the first and second signal levels.

4. An eye direction detecting method according to claim 1, further comprising the steps of:

exposing said eye to a source of light; and detecting light reflected from said eye by use of said photoconductive bit element array.

5. An eye direction detecting method in which eye direction detecting light flux reflected by an eye impinges on a line sensor comprised of a photoconductive bit element array, so that the line sensor generates output signals including a first signal level corresponding to light flux reflected by an iris and a second signal level corresponding to light flux reflected by a retina, whereby information on a point of change between the first signal level and the second signal level is used to detect the eye direction, said eye direction detecting method comprising;

a first step of detecting the point of change between the first signal level and the second signal level to determine a provisional point of change; and a second step of obtaining position data of the point of change based on position data of the provisional point of change.

6. An eye direction detecting method according to claim 5, further comprising the steps of:

exposing said eye to a source of light; and detecting light reflected from said eye by use of said photoconductive bit element array.

7. An eye direction detecting method in which eye direction detecting light flux reflected by an eye impinges on a line sensor comprised of a photoconductive bit element array, so that the line sensor generates output signals including a first signal level corresponding to light flux reflected by an iris and a second level corresponding to light flux reflected by a retina, whereby information on a point of change between the first signal level and the second signal level is used to detect the eye direction, said eye direction detecting method comprising:

a first step of detecting the point of change between the first signal level and the second signal level to determine a provisional point of change;

a second step of obtaining position data of the point of change based on position data of the provisional point of change when the position data of the point of change based on position data of the provisional point of change is obtained.

8. An eye direction detecting method according to claim 7, further comprising the steps of:

exposing said eye to a source of light; and detecting light reflected from said eye by use of said photoconductive bit element array.

9. An eye direction detecting method in which eye direction detecting light flux reflected by an eye impinges on a line sensor comprised of a photoconductive bit element array, so that the line sensor generates output signals including a first signal level corresponding to light flux reflected by an iris and a second signal level corresponding to light flux reflected by a retina, whereby information on a point of change between the first signal level and the second signal level is used to detect the eye direction, said eye direction detecting comprising:

a first step of detecting the point of change between the first signal level and the second signal level to determine a provisional point of change;

a second step of judging whether position data of the point of change based on position data of the provisional point of change is obtained; and a third step of setting the provisional point of change as the point of change when the position data of the point of change based on position data of the provisional point of change is not obtained.

10. An eye direction detecting method according to claim 9, further comprising the steps of:

exposing said eye to a source of light; and detecting light reflected from said eye by use of said photoconductive bit element array.

11. An apparatus for detecting eye direction by detecting the position of a periphery between an iris of the eye and a retina of the eye, the iris and eyeground having different light reflectivity characteristics, said apparatus comprising:

(a) an array of photoconductive bit elements positioned for having impinged thereon light reflected from the eye, each of said bit elements comprising means for converting levels of reflectivity of the reflected light to respective output signals;

(b) means for determining a point of change between a first output level and a second output level along said array of bit elements, said point of change determining means comprising:

(i) means for detecting a pair of bit elements which have outputs larger than and smaller than a predetermined threshold level, respectively, said predetermined threshold level being between the first signal level and the second signal level;

(ii) means for determining a first line based on the outputs of the pair of bit elements or a pair of bit elements which have a specific relationship to said pair of bit elements;

(iii) means for obtaining a zero-cross bit element which is located at an intersecting point of the first line with a predetermined output level;

(iv) means for determining a second line which has an inclination angle in absolute value smaller than that of the first line, based on the outputs of the zero-cross bit element and a bit element having a specific relationship to the zero-cross bit element or the outputs of a pair of bit elements having a specific relationship to the zero-cross bit element;

(v) means for determining a third line which has an inclination angle in absolute value larger than that of the first line with reference to the zero-cross bit element;

(vi) means for judging whether the inclination angle of the second line is substantially identical to that of the third line; and (vii) means for determining the point of change by the intersecting point of the second line and the third line when the inclination angles of the second and third lines are not substantially identical to each other and by the intersecting point of the first line and the second line when the inclination angles of the second and third lines are substantially identical to each other, respectively.

12. An apparatus for detecting eye direction by detecting the position of a periphery between an iris of the eye and a retina of the eye, the iris and retina having different light reflectivity characteristics, said apparatus comprising:

(a) an array of photoconductive bit elements positioned for having impinged thereon light reflected from the eye, each of said bit elements comprising means for converting levels of reflectivity of the reflected light to respective output signals;

(b) means for determining a point of change between a first output level and a second output level along said array of bit elements, said point of change determining means comprising:
  (i) means for detecting the point of change between the first signal level and the second signal level to determine a provisional point of change; and
  (ii) means for obtaining position data of the point of change based on position data of the provisional point of change.

13. The eye direction detecting apparatus according to claim 12, further comprising means for determining a peak value of said output signals, representative of a first Purkinje image, and means for determining eye direction as a function of a relative positional relationship between the point of change and said peak value.

14. The eye direction detecting apparatus according to claim 13 in combination with a camera which has a plurality of focus detecting devices, said combination comprising means for selecting one of said plurality of focus detecting devices in response to said detection of eye direction.

15. An apparatus for detecting eye direction by detecting the position of a periphery between an iris of the eye and a retina of the eye, the iris and retina having different light reflectivity characteristics, said apparatus comprising:

(a) an array of photoconductive bit elements positioned for having impinged thereon light reflected from the eye, each of said bit elements comprising means for converting levels of reflectivity of the reflected light to respective output signals;

(b) means for determining a point of change between a first output level and a second output level along said array of bit elements, said point of change determining means comprising:
  (i) means for detecting the point of change between the first signal level and the second signal level to determine a provisional point of change; and
  (ii) means for obtaining position data of the point of change based on position data of the provisional point of change when the position data of the point of change based on position data of the provisional point of change is obtained.

16. The eye direction detecting apparatus according to claim 15, further comprising means for determining a peak value of said output signals, representative of a first Purkinje image, and means for determining eye direction as a function of a relative positional relationship between the point of change and said peak value.

17. The eye direction detecting apparatus according to claim 16 in combination with a camera which has a plurality of focus detecting devices, said combination comprising means for selecting one of said plurality of focus detecting devices in response to said detection of eye direction.

18. An apparatus for detecting eye direction by detecting the position of a periphery between an iris of the eye and a retina of the eye, the iris and retina having different light reflectivity characteristics, said apparatus comprising:

(a) an array of photoconductive bit elements positioned for having impinged thereon light reflected from the eye, each of said bit elements comprising- means for converting levels of reflectivity of the reflected light to respective output signals;

(b) means for determining a point of change between a first output level and a second output level along said array of bit elements, said point of change determining means comprising:
  (i) means for detecting the point of change between the first signal level and the second signal level to determine a provisional point of change; and
  (ii) means for judging whether position data of the point of change based on position data of the provisional point of change is obtained; and
  (iii) means for setting the provisional point of change as the point of change when the position data of the point of change based on position data of the provisional point of change is not obtained.

19. The eye direction detecting apparatus according to claim 18, further comprising means for determining a peak value of said output signals, representative of a first Purkinje image, and means for determining eye direction as a function of a relative positional relationship between the point of change and said peak value.

20. The eye direction detecting apparatus according to claim 19 in combination with a camera which has a plurality of focus detecting devices, said combination comprising means for selecting one of said plurality of focus detecting devices in response to said detection of eye direction.

* * * * *

UNITED STATES PATENT AND TRADEMARK OFFICE
CERTIFICATE OF CORRECTION

PATENT NO. : 5,485,404
DATED : January 16, 1996
INVENTOR(S) : O. SHINDO

It is certified that error appears in the above-indentified patent and that said Letters Patent is hereby corrected as shown below:

At column 10, line 43 (claim 10, line 13), change "eyeground" to ---retina---.

Signed and Sealed this

Twenty-ninth Day of October 1996

Attest:

BRUCE LEHMAN

*Attesting Officer*     *Commissioner of Patents and Trademarks*